Dec. 8, 1959     KAZUNOSUKE NAITO     2,915,820
PORTABLE MACHINE FOR SHEARING STEEL RODS, WIRE
ROPES, AND THE LIKE
Filed Dec. 24, 1958

INVENTOR.
Kazunosuke Naito
BY N. L. Leek
Atty.

United States Patent Office 2,915,820
Patented Dec. 8, 1959

2,915,820

PORTABLE MACHINE FOR SHEARING STEEL RODS, WIRE ROPES AND THE LIKE

Kazunosuke Naito, Tokyo, Japan

Application December 24, 1958, Serial No. 782,929

Claims priority, application Japan December 31, 1957

4 Claims. (Cl. 30—227)

This invention relates to a portable machine which makes possible to shear easily by means of human power steel rods, wire ropes, and the like in succession without lost motion.

This invention comprises two pieces of disk-shaped cutters pivoted together and having two pairs of U-shaped cutting grooves therein. When one pair of these cutting grooves are aligned in a manner so as to make possible the insertion of the steel rod to be sheared, the other pair are in a staggered relation to each other as would be exhibited after completion of the shearing action. Furthermore, to each of the disk-shaped cutters an arm having a rocking member extends therefrom. And to these rocking members is screwed a screw bar whose one end is provided with left-handed screw threads while its opposite end is provided with right-handed screw threads. A ratchet wheel is affixed to this screw bar and a hand lever for operating it is provided as to be freely rotatable. Moreover, a pawl means is provided whereby the foregoing screw bar is intermittently rotated either in one direction or its opposite by the reciprocating movement of said hand lever. Further objects and advantages of my invention will appear from the detailed description.

Figure 2:
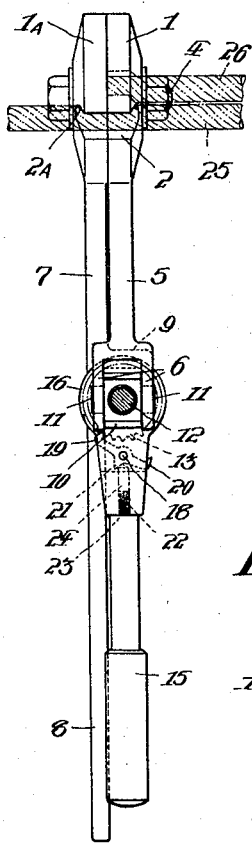
Figure 2 is a side view of the portable machine of Figure 1.
Figure 1:
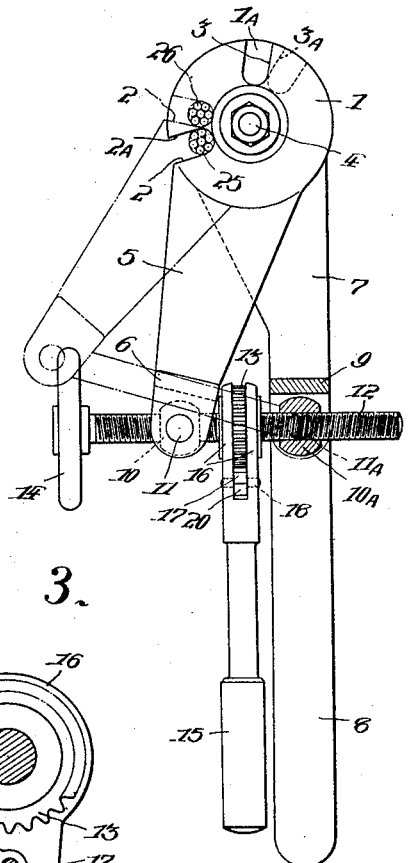
Figure 1 is a plan view with a partial section of a portable machine embodying my invention and the chain line shows its movement.

The following is an explanation of the drawings: The disk-shaped cutter 1 has on its periphery two identical U-shaped grooves 2 and 3 whose edges are formed into cutting blades. While the disk-shaped cutter 1A likewise has U-shaped grooves 2A and 3A of identical shape as the U-shaped grooves 2 and 3 of cutter 1, the distance between the grooves are made to be slightly greater than that of the U-shaped grooves 2 and 3. Precisely, as shown in Figure 1, when the pair of the U-shaped grooves 2 and 2A are positioned one on top of the other forming an opening making possible the insertion of the steel rod to be sheared, the U-shaped grooves 3 and 3A constituting the other pair are made to be in a staggered relation to each other showing that the shearing action has been completed. The disk-shaped cutters 1 and 1A are pivoted together with shaft 4. From cutter 1 an arm 5 extends therefrom and the end of said arm is formed into a fork 6. From cutter 1A a long arm 7 extends therefrom and the end of said arm terminates in a handle 8. An angle iron 9 is affixed as an integral part of the long arm 7 in the middle part thereof, forming a fork-like portion in said arm 7 corresponding to the above-mentioned fork 6. In these forked sections of arm 5 and long arm 7 rocking members 10 and 10A are pivoted therein respectively by means of the respective arbors 11 and 11A protruding therefrom. The right- and left-handedly threaded screws disposed at the opposite ends of screw bar 12 are screwed respectively into the above rocking members 10 and 10A. Thus a turnbuckle is formed by the screw bar 12 and said rocking members 10 and 10A. A ratchet wheel 13 and a hand wheel 14 are affixed to the middle and to one end of screw bar 12 respectively. The tip of the hand lever 15 is formed into a fork 16 which clasps the above ratchet wheel 13 and is attached as to be free to rotate around screw bar 12. At the base of the above fork 16, a switching piece 17 is pivoted at its center with pin 18, and this switching piece 17 is provided with pawls 19 and 20 at the tips thereof and a projection 21 in its center. Between the prongs of fork 16 in the middle thereof at the end of hand lever 15, a small hole 22 is provided wherein are fitted a spring 23 and a sliding stop 24.

Figure 3:
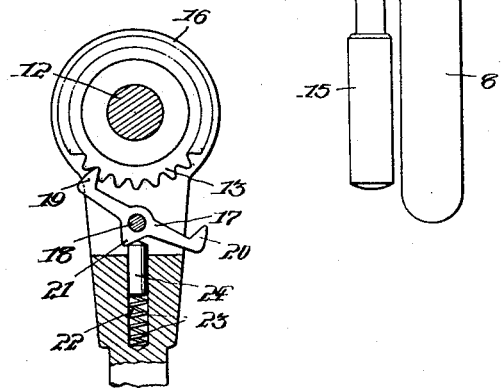
Figure 3 is a side view and a partial section of the ratchet portion on an enlarged scale.

The portable machine for shearing steel rods, wire ropes, and the like of this invention is used as follows: In the position as shown in Figure 1; i.e., where the U-shaped grooves 2 and 2A are aligned one on top of the other and the U-shaped grooves 3 and 3A are in a staggered position, the steel rod, wire rope, and the like 25 to be sheared is inserted in the U-shaped grooves 2 and 2A, the switching piece 17 is manipulated so that pawl 19 is made to engage with ratchet wheel 13 at the same time that projection 21 is disposed to the left of the sliding stop 24, as shown in Figure 3, and then hand lever 15 is actuated with a back and forth motion. By this action, screw bar 12 is intermittently made to rotate in one direction, causing arm 5 and long arm 7 to gradually spread apart reaching the position as shown by the chain line in Figure 1, and as a result, the steel rod and the like 25 is sheared. 26 shows the steel rod and the like in its upper position from 25 after being displaced by the shearing action of U-shaped groove 2. Concomitant with the movement of the above arm 5, U-shaped groove 3 becomes lined up with U-shaped groove 3A. Then, if it is desired to shear another steel rod, it is placed in the U-shaped grooves 3 and 3A, the switching piece 17 is manipulated whereby pawl 20 is made to engage with ratchet wheel 13 while at the same time projection 21 is made to move to the other side of the sliding stop 24, and hand lever 15 is actuated with a back and forth motion. In this case, screw bar 12 is caused to rotate intermittently in the opposite direction and arm 5 and long arm 7 gradually approach each other returning to their original positions as shown by the solid lines in Figure 1, and as a result, the steel rod is sheared. In this manner, it is possible to shear the steel rods in succession by alternately using the U-shaped grooves 2 and 2A and 3 and 3A, and thus by eliminating any lost motion, the machine of this invention possesses remarkably good efficiency from the stand point of time economy.

Furthermore, its construction is simple and it is easy to operate. When it is desired to change rapidly the distance between arm 5 and long arm 7 when not shearing anything; i.e., to rotate screw bar 12 load-free, it is merely necessary to turn hand wheel 15 by hand instead of using hand lever 15.

Although certain embodiments of the invention have been shown and described for purposes of illustration, it is to be understood that the invention may be applied to various uses and that changes and modifications may be made therein as will be apparent to a person skilled in the art.

What is claimed is:

1. A portable machine for shearing steel rods, wire ropes, and the like comprising two disk shaped cutters pivoted by a shaft, said cutters having two pairs of U-shaped grooves disposed in such a fashion that when one pair of said U-shaped grooves are in alignment with each other with one groove superimposed on the other, the other pair are in staggered relation to each other as would be exhibited after a shearing of a rod had been completed, furthermore, extending from said two disk-shaped cutters arms having rocking members fitted therein, a screw bar whose opposite ends have right-handed and left-handed threads respectively being screwed to said respective rocking members, said screw bar being provided with a fixed ratchet wheel operated by a freely rotatable hand lever attached thereto, and switching means for pawls for rotating said screw bar in one direction or its opposite by the actuation of said hand lever.

2. A portable machine for shearing steel rods, wire ropes, and the like according to claim 1 wherein a switching piece having pawls at both of its tips and a projection in the middle thereof is pivoted to the hand lever, said projection being engaged with a spring-loaded sliding stop fitted into a small hole provided in said hand lever.

3. A portable machine for shearing steel rods, wire ropes, and the like according to claim 1 wherein a hand wheel for rapidly turning the screw bar having left- and right-handed screw threads is affixed thereto.

4. A portable machine for shearing steel rods, wire ropes, and the like according to claim 1 wherein one of the arms of the disk-shaped cutters is made to be a long arm and the extremity thereof is made to be a handle.

No references cited.